June 25, 1957 R. T. DUFFEY ET AL 2,797,402

MEANS FOR GENERATING SYNCHRONIZING PULSES FOR MAGNETIC STORAGE DEVICES

Filed May 9, 1955

INVENTORS
R. T. DUFFEY
V. L. DAGOSTINO

BY

[signature]

ATTORNEY

United States Patent Office 2,797,402

Patented June 25, 1957

2,797,402

MEANS FOR GENERATING SYNCHRONIZING PULSES FOR MAGNETIC STORAGE DEVICES

Robert T. Duffey, Glen Oaks, N. Y., and Vincent L. Dagostino, Stirling, N. J., assignors to The Teleregister Corporation, Stamford, Conn., a corporation of Delaware Application May 9, 1955, Serial No. 507,076

17 Claims. (Cl. 340—174)

The present invention relates to rotatable magnetic storage devices such as drums, disks and the like, and more particularly to a means for developing synchronization pulses commonly associated with such devices.

The conventional magnetic drum memory or storage device comprises an oxide-coated rotating cylinder divided into many minute areas which may be selectively magnetized to store binary digits or "bits" representing information. These areas are defined by first dividing the drum into a plurality of narrow tracks or channels extending around the periphery thereof. Each track is then subdivided peripherally into bins or slots. Information is recorded on the drum and read off by magnetic heads associated with the various scanning tracks. Each track may have a reading head and a recording head positioned adjacent the cylinder and aligned with the track. Alternatively, one read-record head may be provided for each track to perform both the reading and recording functions.

The peripheral subdivision of each track is determined by a fixed set of pulses that are in time coincidence with the drum's rotation. By counting these synchronization pulses, starting from a distinctive signal which occurs once per revolution, the associated drum circuitry can determine exactly which bin is under all the scanning heads at any instant. It is understood therefore that when it is desired that a particular bit representing stored information is to be read, two selections are required. First, the scanning head for the proper channel is selected, and second, starting from the one per revolution pulse, a count is generated from the synchronization pulses until coincidence is reached with the known area of the desired bit of information. The proper area or bin is then under the scanning head and is available for reading or recording. A system employing this general type of device is shown in the copending application of Connolly, May and Schmidt, Serial No. 232,548, filed June 20, 1951, and assigned to the same assignee as the present application.

One method of generating synchronization pulses that is currently in use consists of a specially engraved sync track on one end of the drum. This track has a short longitudinal engraving at each pulse position. Each engraving is about .005" to .006" wide, .005" to .006" deep and 3/32" long. When engraving is complete, this band of narrow slots is filled with Alnico powder and sealed. A scanning head is mounted over this synchronization track and with the drum rotating a train of pulses, one per slot, is generated. These pulses are then used for locating stored bits of information on the coated storage portion of the drum.

Over the past few years improvements in the various components of the drum and associated elements have made possible an increase in the packing factor, i. e., the number of bits per linear inch stored in any channel on the drum's coated surface. The engraving of an increased number of synchronization pulses per linear inch, however, has led to a number of problems. The most important of these lies in the fact that there is a lower limit to the distance between slots, at which point fringing flux of adjacent slots distorts the generated pulses. It is to this general problem of increasing the frequency of the synchronization pulses that the present invention is directed.

Accordingly, a primary object of the present invention is to provide means for increasing the frequency of synchronization pulses obtained from a rotating drum storage device.

Another object of the present invention is to provide a synchronizing pulse generating system of the rotating drum type wherein the distortion of the pulses due to fringe flux is minimized.

A further object is to provide a system of doubling the frequency of synchronization pulses obtained from a rotating drum memory device.

A still further object of the present invention is to provide means for increasing the frequency of synchronization pulses from a rotating drum storage device while maintaining the required drum area for the synchronization track at a minimum.

These and other objects of the present invention will become apparent from the following description taken with the drawings.

In achieving the above objects, one embodiment of this invention contemplates a half-frequency synchronization track engraved with half the number of pulse producing slots. Instead of the usual one reading head, two such heads are provided to scan the half-frequency track. These scanning heads are peripherally spaced so that one is located over a pulse position when the other is over a space. In this manner pulses are alternately generated in the reading heads at full synchronization frequency. The output of each head is then amplified, shaped and passed to a mixer. The output of the mixer is twice the half-frequency output of each scanning head or full frequency. The distance between the scanning heads must equal $N+\frac{1}{2}$ pulse positions where N is zero or any whole number.

An alternative embodiment of the present invention takes the form of two independent synchronization tracks with a reading head positioned to scan each track. Each track is engraved and contains magnetic inserts of a number to provide pulses of half frequency. The relative positioning of the scanning heads and inserts must be such that one head scans an insert as the other is scanning a space. This may be accomplished by either off-setting the heads or by staggering the inserts. In either case, pulses are alternately generated in the reading heads. The outputs are amplified, shaped and passed to a mixer which combines the half-frequency pulses into a full frequency train of pulses.

The present invention will be more fully understood from the following detailed description considered with the drawings, in which.

Figure 1:
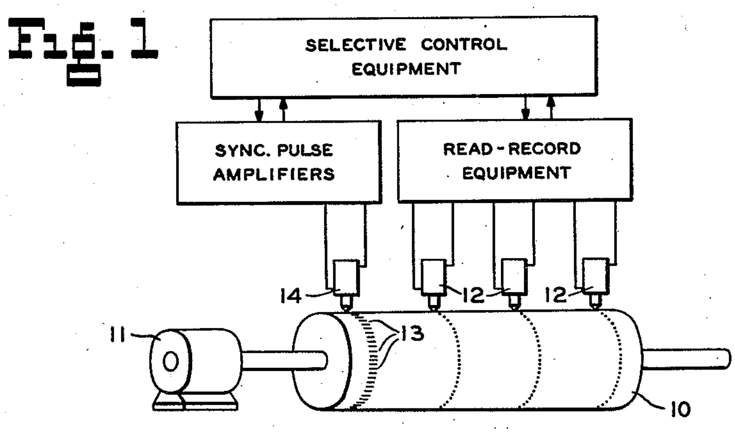
Fig. 1 is a diagrammatic representation of a conventional system showing the rotating magnetic drum and scanning heads.
Figure 2:
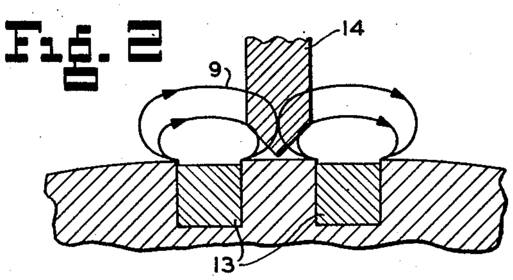
Fig. 2 is an enlarged cross-section of a portion of the drum taken through the synchronization track to show the magnetic inserts.

Referring now to the drawings, numeral 10 represents a rotatable drum storage device rotated at a constant speed by motor 11. A plurality of read-record heads 12 are positioned above the drum and serve to divide it into peripheral tracks or channels. Binary digits or bits representing intelligence are recorded on the drum and read therefrom by means of heads 12 in a well known manner. The necessary synchronization pulses are obtained from the specially engraved sync track at one end of the drum. This track has a series of equally spaced inserts 13 of magnetic material such as Alnico which rotate under a reading head 14. As the line of inserts pass under the reading head, a pulse train is generated of a frequency dependent upon the packing factor or inserts per linear inch of drum surface. It is apparent therefore that the frequency will be increased if the inserts are located closer together for the same speed of rotation of the drum. However, as the inserts are brought closer, a point is reached where the magnetic flux between adjacent inserts overlap to an extent as to impair the definition of the generated pulses. This fringing effect is seen in Fig. 2 where the mutual interference of the lines of flux 9 of adjacent inserts 13 is shown.

In order to increase the frequency without losing read-back definition, the present invention provides a synchronization track 15 having the inserts spaced apart a distance to give one half frequency based upon a particular drum speed. A pair of reading heads 16 and 17 are located above sync track 15 and are peripherally displaced a distance of one and one-half pulse positions as shown. Thus, as an insert 13 generates a pulse in head 16, a space is located below head 17. When the drum rotates through a distance of one-half a pulse position, a pulse will be generated in head 17 so that each head receives a train of pulses of half frequency. Each of the pulse trains from heads 16 and 17 is amplified by amplifiers 18 and 19 respectively, and passed to pulse shapers 21 and 22. The outputs of the shapers comprise identical pulse trains displaced 180°. Each train is then fed to the inputs of a mixer 23, the output of which is the desired synchronization pulse frequency. Though the reading heads 16, 17 are spaced apart a distance of one and one-half pulse positions in Fig. 3, it is readily understood that the same results would accrue if the heads were displaced one-half of a pulse position. However, such a close positioning results in problems of mechanical mounting. Similarly, this displacement could be any $N+\frac{1}{2}$ pulse positions, such as two and one-half, three and one-half, etc. As is well known to those familiar with rotatable drum storage devices, the usual synchronization track has a blank or unrecorded arc to provide a time interval between successive scannings of the data record to permit resetting of the counting equipment. Because of this blank interval the heads 16 and 17 should be spaced apart only a half pulse position. However, the broader concept of this invention is not so limited.

It is of course understood that while the above description refers to a sync track having inserts of one-half the desired frequency and two reading heads, the invention could equally well provide a track of one-third, one-fourth, etc., the desired rate with reading heads in the number of three, four, etc., respectively. With three reading heads each would be displaced $(N+\frac{1}{3})$ pulse positions, and with four heads the displacement would be $(N+\frac{1}{4})$ pulse positions, etc., with N equal to zero or a whole number.

Figures 3, 4:
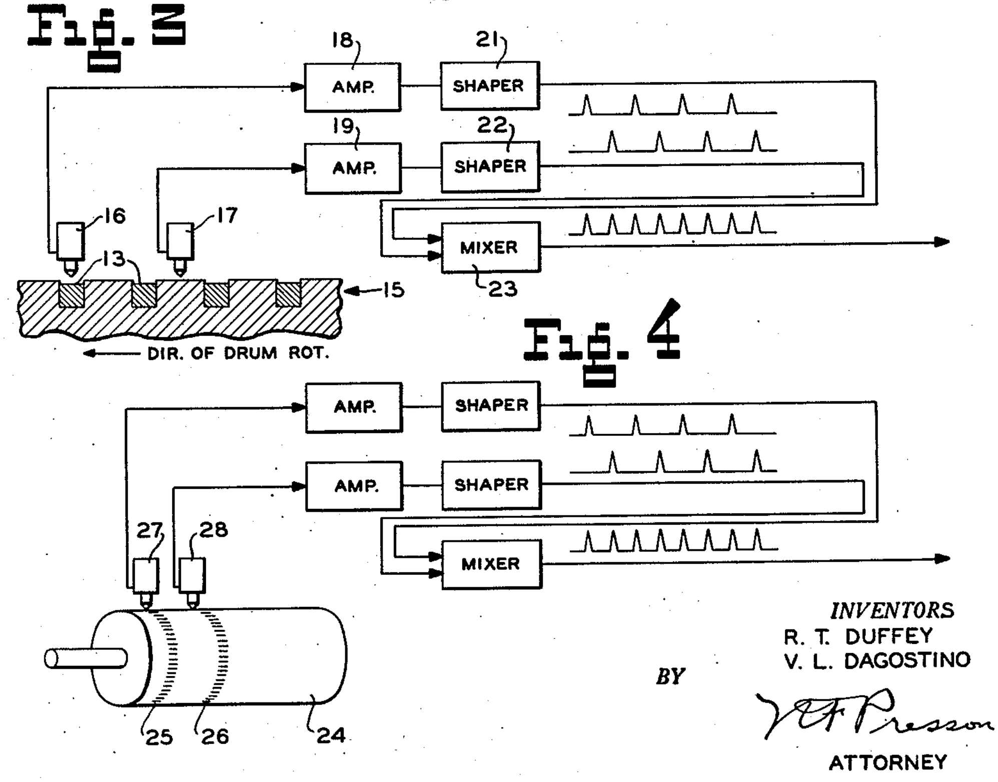
Fig. 3 shows diagrammatically the synchronization pulse producing system of the present invention.
Fig. 4 shows a modification of the system of Fig. 3.

Fig. 4 shows an alternative embodiment of the invention in which the drum 24 has two sync tracks 25 and 26. Each of these tracks has a series of magnetic inserts similar to track 15. Similarly, tracks 25 and 26 are each engraved at one-half the desired frequency and rotate under scanning heads 27 and 28, respetcively. In order to obtain the full frequency synchronization pulses, the relative positions of the heads 27, 28 and tracks 25, 26 must be such that one head scans an insert as the other head scans a space area. One arrangement for meeting this requirement is to stagger the inserts of the two tracks, i. e., an insert of track 25 is opposite a space area of track 26, as seen in Fig. 4. Then by aligning the scanning heads 27, 28 pulses will be alternately generated in the two heads. Since the inserts of each track are packed to give half frequency, the pulse frequency in each scanning head will likewise be one-half of the desired rate. The outputs of the heads 27, 28 are then fed to a circuit identical with that of Fig. 3 where each pulse train is amplified, shaped and passed to a mixer whose output is twice the frequency of each pulse train or full frequency. An alternative arrangement of the two track system of Fig. 4 would have the inserts of each of the tracks 25, 26 longitudinally aligned and the heads 27, 28 peripherally offset an amount equal to $(N+\frac{1}{2})$ pulse positions. This arrangement will similarly provide pulse trains 180° out of phase which may be combined to obtain a full frequency train.

The arrangement of Fig. 4 shows two tracks each of which has inserts packed to provide one-half the desired frequency. However, this multi-track systetm is not limited to two tracks. This system could take the form of three, four, etc. tracks, each having inserts packed at $\frac{1}{3}$, $\frac{1}{4}$, etc., the desired frequency rate with a scanning head associated with each track. The heads would be offset $(N+\frac{1}{3})$, $(N+\frac{1}{4})$, etc. pulse positions respectively.

Though the present invention has been disclosed with respect to specific embodiments thereof, it is understood that these are not to be considered as limiting the invention as defined in the appended claims.

What is claimed is:

1. A magnetic storage device comprising a rotatable member, synchronization pulse producing means including a plurality of arcuately arranged magnetic inserts embedded in the surface of said member, said inserts being spaced and magnetized to provide fields of magnetic flux, a pair of scanning heads located adjacent said surface so as to be cut by said magnetic fields as the member rotates, said scanning heads being relatively displaced a distance of $(N+\frac{1}{2})\times D$ where N is zero or an integer and D is the distance between corresponding points of adjacent inserts whereby pulses are alternately generated in said scanning heads, an amplifying means connected to each of the scanning heads, a wave shaping means connected to each of the amplifying means whereby the pulses alternately generated in each head are amplified and shaped and a mixer connected to both of said wave shaping means whereby a pulse train is obtained having twice the frequency of the pulses generated in each scanning head.

2. A magnetic storage device comprising a rotatable member, synchronization pulse producing means including a plurality of arcuately arranged magnetized areas in the surface of said member, said magnetized areas being spaced and providing fields of magnetic flux, a pair of scanning heads located adjacent said surface so as to be cut by said magnetic fields as the member rotates, said scanning heads being relatively displaced a distance equal to one-half the distance between corresponding points of adjacent magnetized areas whereby pulses are alternately generated in said scanning heads, an amplifying means connected to each of the scanning heads, a wave shaping means connected to each of the amplifying means whereby the pulses alternately generated in each head are amplified and shaped and a mixer connected to both of said wave shaping means whereby a pulse train is obtained having twice the frequency of the pulses generated in each scanning head.

3. A magnetic storage device comprising a rotatable member, synchronization pulse producing means including a plurality of arcuately arranged magnetized areas in the surface of said member, said magnetized areas being spaced and providing fields of magnetic flux, a pair of scanning heads located adjacent said surface so as to be cut by said magnetic fields as the member rotates, said scanning heads being relatively displaced a distance of $(N+\frac{1}{2})\times D$ where N is zero or an integer and D is the distance between corresponding points of adjacent magnetized areas whereby pulses are alternately generated in said scanning heads, an amplifying means connected to each of the scanning heads, a wave shaping means connected to each of the amplifying means whereby the pulses alternately generated in each head are amplified and shaped and a mixer connected to both of said wave shaping means whereby a pulse train is obtained having twice the frequency of the pulses generated in each scanning head.

4. A magnetic storage device comprising a rotatable member, synchronization pulse producing means including a plurality of arcuately arranged magnetic inserts embedded in the surface of said member, said inserts being spaced and magnetized to provide fields of magnetic flux, a pair of scanning heads located adjacent said surface so as to be cut by said magnetic fields as the member rotates, said scanning heads being relatively displaced a distance equal to one-half the distance between corresponding points of adjacent inserts whereby pulses are alternately generated in said scanning heads, and means connected to both of said scanning heads wherby a pulse train is obtained having twice the frequency of the pulses generated in each scanning head.

5. In a magnetic storage device wherein a rotatable circular member is adapted to have information magnetically stored thereon, synchronization pulse producing means comprising a series of spaced magnetized areas in the surface of said member, said magnetized areas being arranged to define a narrow synchronization track around a substantial peripheral arc of said member, a pair of scanning heads located adjacent said member so as to be cut by fields of flux provided by said magnetized areas, said scanning heads being angularly displaced a distance substantially equal to $(N+\frac{1}{2})\times D$ where N is zero or an integer and D is the distance between corresponding points of adjacent magnetized areas whereby pulses are alternately generated in said scanning heads, and means to combine the generated pulses into a pulse train having twice the frequency of the pulses generated in each head.

6. In a magnetic storage device wherein a rotatable circular member is adapted to have information magnetically stored thereon, synchronization pulse producing means comprising a series of spaced magnetized areas in the surface of said member, said magnetized areas being arranged to define a narrow synchronization track around a substantial peripheral arc of the member, a pair of scanning heads located adjacent said member so as to be cut by fields of flux set up by the magnetized areas, said scanning heads being angularly displaced a distance substantially equal to one-half the distance between corresponding points of adjacent magnetized areas whereby pulses are alternately generated in said scanning heads, and means to combine the generated pulses into a pulse train having twice the frequency of the pulses generated in each head.

7. In a magnetic storage device wherein a rotatable circular member is adapted to have information magnetically stored thereon, synchronization pulse producing means comprising a series of spaced magnetic inserts embedded in the surface of said member, said inserts being arranged to define a narrow synchronization track around a substantial peripheral arc of the member, each of the inserts being magnetized to provide fields of magnetic flux, a pair of scanning heads located adjacent said member so as to be cut by said fields of flux, said scanning heads being angularly displaced a distance substantially equal to $(N+\frac{1}{2})\times D$ where N is zero or an integer and D is the distance between corresponding points of adjacent inserts whereby pulses are alternately generated in said scanning heads, and means to combine the generated pulses into a pulse train having twice the frequency of the pulses generated in each head.

8. In a magnetic storage device wherein a rotatable circular member is adapted to have information magnetically stored thereon, synchronization pulse producing means comprising a series of spaced magnetic inserts embedded in the surface of said member, said inserts arranged to define a narrow synchronization track around a substantial peripheral arc of the member, each of the inserts being magnetized to provide fields of magnetic flux, a pair of scanning heads located adjacent said member so as to be cut by said fields of flux, said scanning heads being angularly displaced a distance substantially equal to one-half the distance between corresponding points of adjacent inserts whereby pulses are alternately generated in said scanning heads, and means to combine the generated pulses into a pulse train having twice the frequency of the pulses generated in each head.

9. In a magnetic storage device wherein a rotatable circular member is adapted to have information magnetically stored thereon, synchronization pulse producing means comprising a series of equally spaced magnetized areas in the surface of said member, said magnetized areas being arranged to define a narrow synchronization track around a substantial peripheral arc of the member, a plurality of scanning heads located adjacent said member so as to be cut by said fields of flux, said scanning heads being angularly displaced a distance substantially equal to $(N+1/P)\times D$ where N is zero or an integer, D is the distance between pulse positions and P is the number of scanning heads whereby pulses are sequentially generated in said scanning heads and means connected to the scanning heads to combine the generated pulses into a pulse train having a frequency of P times the frequency of the pulses generated in each head.

10. In a magnetic storage device wherein a rotatable member is adapted to have information magnetically stored thereon, synchronization pulse producing means comprising a series of spaced magnetic inserts embedded in the surface of said member, said inserts being arranged to define a narrow synchronization track around a substantial peripheral arc of the member, each of the inserts being magnetized to provide fields of magnetic flux, a plurality of scanning heads located adjacent said member so as to be cut by said fields of flux, said scanning heads being angularly displaced a distance substantially equal to $(N+1/P)\times D$ where N is zero or in integer, D is the distance between pulse positions and P is the number of scanning heads whereby pulses are sequentially generated in said scanning heads and means connected to the scanning heads to combine the generated pulses into a pulse train having a frequency of P times the frequency of the pulses generated in each head.

11. In a magnetic storage device wherein a rotatable circular member is adapted to have information magnetically stored thereon, synchronization pulse producing means comprising a series of spaced magnetized areas in the surface of said member, said magnetized areas being arranged to define a narrow synchronization track around a substantial peripheral arc of said member, a plurality of scanning heads located adjacent said member so as to be cut by said fields of flux, said scanning heads being angularly displaced a distance substantially equal to $(N+1/P)\times D$ where N is zero or an integer, D is the distance between pulse positions and P is the number of scanning heads whereby pulses are sequentially generated in said scanning heads and means connected to the scanning heads to combine the generated pulses into a pulse train having a frequency of P times the frequency of the pulses generated in each head.

12. In a magnetic storage device wherein a rotatable circular member is adapted to have information magnetically stored thereon, synchronization pulse producing means comprising a first and second synchronization track, each of said first and second tracks comprising a series of spaced magnetized areas in the surface of said member around a substantial peripheral arc thereof, a first and second scanning head located adjacent said first and second tracks respectively, said first and second scanning heads being relatively displaced with respect to the first and second series of magnetized areas a distance of $(N+\frac{1}{2})\times D$ where N is zero or an integer and D is the distance between corresponding points of adjacent magnetized areas whereby pulses are alternately generated in said first and second heads and means to combine the generated pulse into a pulse train having twice the frequency of the pulses generated in each head.

13. In a magnetic storage device wherein a rotatable circular member is adapted to have information magnetically stored thereon, synchronization pulse producing means comprising a first and second synchronization track, each of said first and second tracks comprising a series of spaced magnetized areas in the surface of said member around a substantial peripheral arc thereof, a first and second scanning head located adjacent said first and second tracks respectively, said first and second scanning heads being relatively displaced with respect to the first and second series of magnetized areas a distance equal to one-half the distance between corresponding points of adjacent magnetized areas whereby pulses are alternately generated in said first and second heads and means to combine the generated pulse into a pulse train having twice the frequency of the pulses generated in each head.

14. In a magnetic storage device wherein a rotatable circular member is adapted to have information magnetically stored thereon, synchronization pulse producing means comprising a first and second synchronization track, each of said first and second tracks comprising a series of spaced magnetic inserts embedded in the surface of said member around a substantial peripheral arc thereof, each of said inserts beig magnetized to provide fields of magnetic flux, a first and second scanning head located adjacent said first and second tracks respectively, said first and second scanning heads being relatively displaced with respect to the first and second series of inserts a distance of $(N+\frac{1}{2})\times D$ where N is zero or an integer and D is the distance between corresponding points of adjacent inserts whereby pulses are alternately generated in said first and second heads and means to combine the generated pulse into a pulse train having twice the frequency of the pulses generated in each head.

15. In a magnetic storage device wherein a rotatable circular member is adapted to have information magnetically stored thereon, synchronization pulse producing means comprising a first and second synchronization track, each of said first and second synchronization tracks comprising a series of spaced magnetic inserts embedded in the surface of said member around a substantial peripheral arc thereof, each of said inserts being magnetized to provide fields of magnetic flux, a first and second scanning head located adjacent said first and second tracks respectively, said first and second scanning heads being relatively displaced with respect to the first and second series of inserts a distance equal to one-half the distance between corresponding points of adjacent inserts whereby pulses are alternately generated in said first and second heads and means to combine the generated pulse into a pulse train having twice the frequency of the pulses generated in each head.

16. In a magnetic storage device wherein a rotatable circular member is adapted to have information magnetically stored thereon, synchronization pulse producing means comprising a plurality of synchronization tracks, each of said tracks comprising a series of spaced magnetized areas in the surface of said member around substantial peripheral arcs thereof, a plurality of scanning heads corresponding in number to said plurality of tracks, each scanning head being located adjacent a respective synchronization track, said scanning heads being relatively displaced with respect to their respective tracks a distance of $(N+1/P)\times D$ where N is zero or an integer, D is the distance between pulse positions and P is the number of tracks whereby pulses are sequentially generated in said scanning heads to combine the generated pulses into a pulse train having a frequency of P times the frequency of the pulses generated in each head.

17. In a magnetic storage device wherein a rotatable circular member is adapted to have information magnetically stored thereon, synchronization pulse producing means comprising a plurality of synchronization tracks, each of said tracks comprising a series of spaced magnetic inserts embedded in the surface of said member around substantial peripheral arcs thereof, each of said inserts being magnetized to provide fields of magnetic flux, a plurality of scanning heads corresponding in number to said plurality of tracks, each scanning head being located adjacent a respective synchronization track, said scanning heads being relatively displaced with respect to their respective tracks a distance of $(N+1/P)\times D$ where N is zero or an integer, D is the distance between pulse positions and P is the number of tracks whereby pulses are sequentially generated in said scanning heads to combine the generated pulses into a pulse train having a frequency of P times the frequency of the pulses generated in each head.

No references cited.